(12) United States Patent
Choquet

(10) Patent No.: US 11,916,387 B2
(45) Date of Patent: Feb. 27, 2024

(54) ADAPTIVE CONTROL OF ELECTRICITY CONSUMPTION

(71) Applicant: Barksdale, Inc., Los Angeles, CA (US)

(72) Inventor: Pascal Choquet, Oberursel (DE)

(73) Assignee: Barksdale, Inc., Los Angeles, CA (US)

( * ) Notice: Subject to any disclaimer, the term of this patent is extended or adjusted under 35 U.S.C. 154(b) by 0 days.

(21) Appl. No.: 17/640,162

(22) PCT Filed: Sep. 3, 2020

(86) PCT No.: PCT/US2020/049204
§ 371 (c)(1),
(2) Date: Mar. 3, 2022

(87) PCT Pub. No.: WO2021/046222
PCT Pub. Date: Mar. 11, 2021

(65) Prior Publication Data
US 2022/0294220 A1    Sep. 15, 2022

Related U.S. Application Data

(60) Provisional application No. 62/896,087, filed on Sep. 5, 2019.

(51) Int. Cl.
*G05B 19/042* (2006.01)
*H02J 3/14* (2006.01)
*H02J 3/00* (2006.01)

(52) U.S. Cl.
CPC ............. *H02J 3/14* (2013.01); *G05B 19/042* (2013.01); *H02J 3/003* (2020.01); *G05B 2219/2639* (2013.01); *H02J 2310/54* (2020.01); *H02J 2310/64* (2020.01)

(58) Field of Classification Search
CPC ....... G06Q 40/04; Y04S 20/222; Y04S 20/20; Y02B 70/3225; Y02B 90/20; H02J 3/14; H02J 2310/64; H02J 3/003; G05B 15/02; G05B 13/02; G05B 2219/2639; G05B 2219/2642; G05B 2219/40458
See application file for complete search history.

(56) References Cited

U.S. PATENT DOCUMENTS

| | | | | |
|---|---|---|---|---|
| 4,859,834 A * | 8/1989 | Hausler | ............. | G05D 23/1913 374/134 |
| 5,183,998 A * | 2/1993 | Hoffman | ................. | A47J 31/52 219/508 |
| 5,644,173 A * | 7/1997 | Elliason | .................... | H02J 3/14 307/29 |
| 7,274,975 B2 * | 9/2007 | Miller | ....................... | H02J 3/14 700/295 |

(Continued)

*Primary Examiner* — Darrin D Dunn
(74) *Attorney, Agent, or Firm* — Standley Law Group LLP; Adam J. Smith; Bryan P. Finneran

(57) ABSTRACT

A method for controlling a process that draws power from an electrical power source operates by obtaining time-related electrical demand data from the electrical power source and adaptively adjusting at least one control parameter in a control algorithm for the process to reduce the cost of the electrical energy consumed. The time-related electrical demand data indicates at least diurnal variation, and optionally seasonal variation, in electrical power demand. The time-related electrical power demand data may also include real-time electrical power demand data from the electrical power source.

9 Claims, 3 Drawing Sheets

(56) References Cited

U.S. PATENT DOCUMENTS

| | | | | |
|---|---|---|---|---|
| 7,561,977 | B2* | 7/2009 | Horst | H02J 13/00006 |
| | | | | 702/62 |
| 8,738,546 | B2* | 5/2014 | Basak | G06Q 30/00 |
| | | | | 705/412 |
| 8,897,923 | B2* | 11/2014 | Haynes | H02J 3/14 |
| | | | | 705/7.31 |
| 9,160,169 | B2* | 10/2015 | Hanks | H02J 3/472 |
| 9,429,927 | B2* | 8/2016 | Nesler | G06Q 30/0206 |
| 9,874,885 | B2* | 1/2018 | Shetty | H02J 3/38 |
| 10,333,731 | B2* | 6/2019 | Ebrom | H04L 12/2816 |
| 10,816,942 | B2* | 10/2020 | Ghosh | G05B 13/048 |
| 2003/0050738 | A1* | 3/2003 | Masticola | G06Q 50/06 |
| | | | | 700/286 |
| 2004/0215529 | A1* | 10/2004 | Foster | G06Q 30/0601 |
| | | | | 705/26.1 |
| 2009/0187499 | A1* | 7/2009 | Mulder | G06Q 10/00 |
| | | | | 705/30 |
| 2009/0240381 | A1* | 9/2009 | Lane | H02J 3/14 |
| | | | | 700/286 |
| 2010/0217651 | A1* | 8/2010 | Crabtree | G06Q 10/00 |
| | | | | 705/37 |
| 2011/0251730 | A1* | 10/2011 | Pitt | G06Q 50/06 |
| | | | | 700/291 |
| 2012/0053737 | A1 | 3/2012 | Valluri et al. | |
| 2012/0065791 | A1 | 3/2012 | Besore et al. | |
| 2012/0101651 | A1* | 4/2012 | Haynes | H02J 3/14 |
| | | | | 700/295 |
| 2012/0310377 | A1* | 12/2012 | Prentice | G06Q 50/06 |
| | | | | 700/36 |
| 2013/0066482 | A1* | 3/2013 | Li | H02J 3/144 |
| | | | | 700/297 |
| 2013/0144451 | A1* | 6/2013 | Kumar | G05B 13/02 |
| | | | | 700/291 |
| 2014/0060064 | A1 | 3/2014 | Agostinelli et al. | |
| 2016/0072287 | A1* | 3/2016 | Jia | H02J 3/0073 |
| | | | | 700/295 |
| 2016/0124411 | A1* | 5/2016 | Tinnakornsrisuphap | |
| | | | | H02J 3/008 |
| | | | | 700/291 |
| 2017/0237289 | A1* | 8/2017 | Thompson | H02J 3/003 |
| | | | | 700/296 |
| 2017/0356450 | A1* | 12/2017 | Cheng | G05D 7/0617 |
| 2017/0372244 | A1* | 12/2017 | Westergaard | G06Q 10/06313 |
| 2019/0197635 | A1* | 6/2019 | Kim | G06Q 20/308 |
| 2019/0385248 | A1* | 12/2019 | Matsuoka | F24F 11/523 |

* cited by examiner

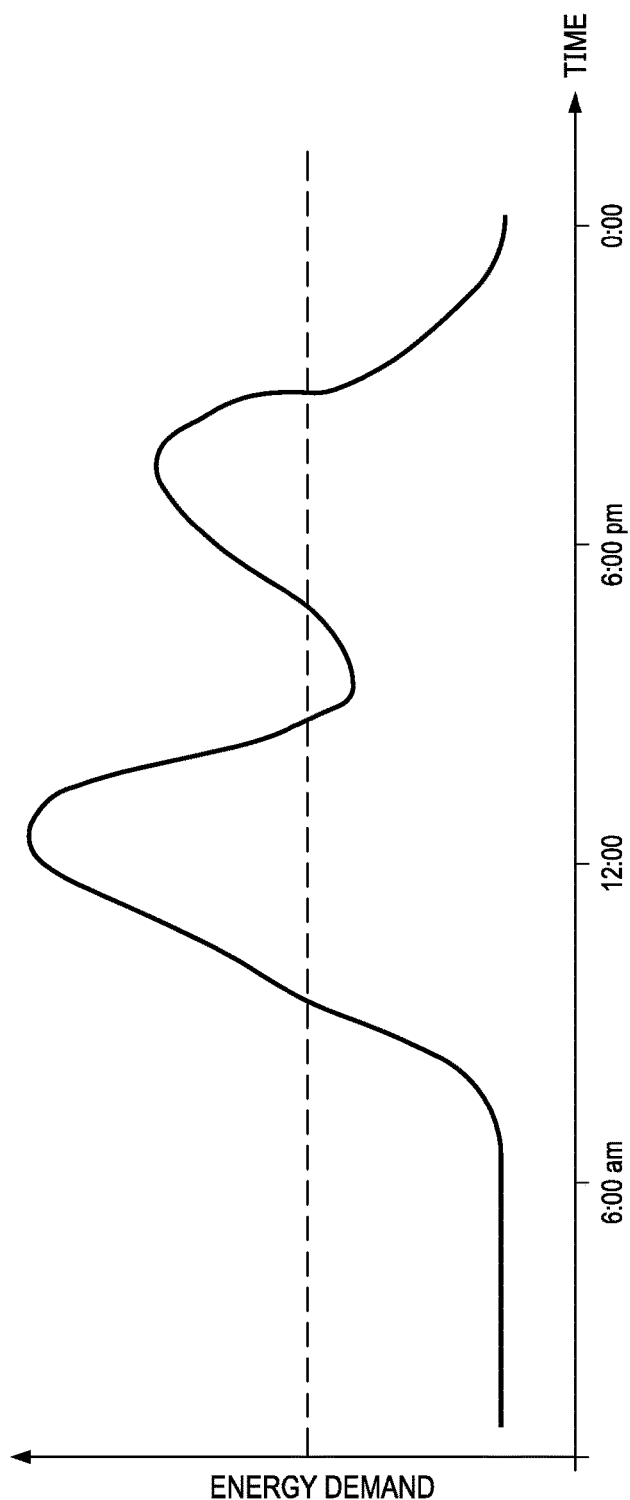
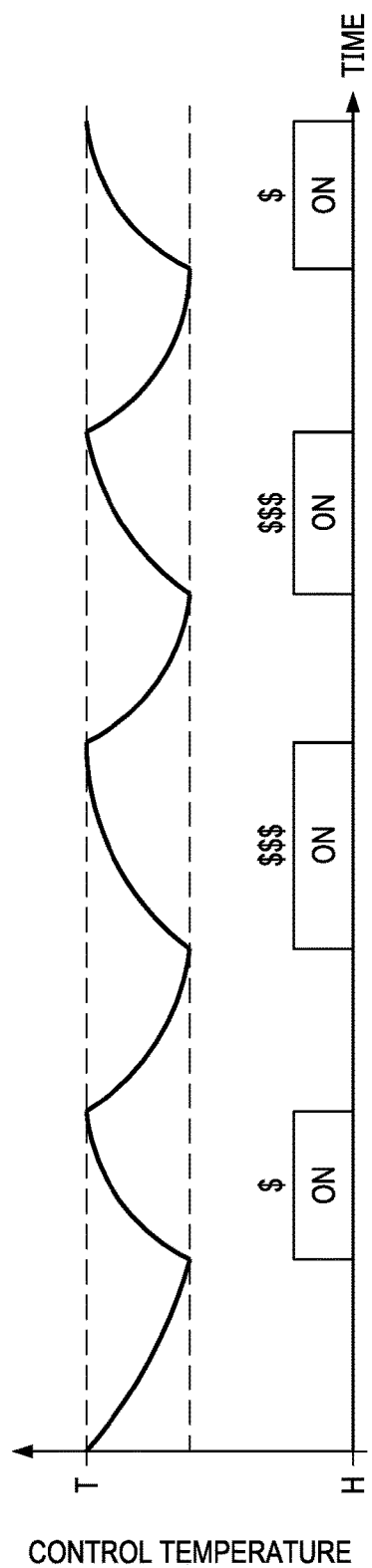
FIG. 3A
FIG. 3B

ADAPTIVE CONTROL OF ELECTRICITY CONSUMPTION

CROSS-REFERENCE TO RELATED APPLICATIONS

This application is a non-provisional application of U.S. provisional application 62/896,087, filed on 5 Sep. 2019, to which a claim of priority is made.

TECHNICAL FIELD

This invention relates to methods of controlling one or more control devices that are drawing electrical power for a system under control, so that the individual control devices and the overall system interact with models of predicted electrical consumption and real time electrical consumption in a "smart grid" to economize on the consumption of electrical power by adapting the consumption as a function of the smart grid. A particular embodiment covers temperature control along a pipeline.

BACKGROUND OF THE ART

The electrical energy consumed in a power grid varies diurnally and seasonally in a somewhat generally predictable manner. For example, in a given time zone, electrical demand will reduce to a local minimum from late evening until morning, when demand moves up as a population wakens and gets to their normal daily activity. Daily local maxima are also seen at the lunch period and dinner period. The length of the daylight also affects the electrical demand as the seasons change, and a seasonal affect is also observed regarding electrical heating (and blower motor) demand in winter and in summer air conditioning demand, which may be more influential on demand than heating.

Electrical energy generated for the grid is not generally subject to storage by the providers. In any period, as demand increases, additional power is brought into the grid. In general, and always (in a well-regulated power grid), the marginal power added to the grid is the lowest cost additional power that is not in the system, but it is also at least as expensive on a per unit basis as the power most recently added to the grid.

It is a well-established intention of the international electrical market to establish what is referred to in this application as the "smart grid." In a "smart grid," the consumers of electrical power beyond a base threshold will be able to communicate directly with electrical power suppliers in an electrical power exchange.

As a global electrical grid arises, it is an unmet need to provide economic advantage to a consumer by utilizing its consumption system as an effective "reservoir" for reducing or optimizing costs.

SUMMARY

These unmet needs of the prior art are overcome at least in part by the present invention which provides a method for controlling a process that draws power from an electrical power source. Such a method comprises the steps of:
obtaining time-related electrical demand data from the electrical power source; and
adaptively adjusting at least one control parameter in a control algorithm for the process to reduce the cost of the electrical energy consumed.

In many of these methods, the time-related electrical demand data indicates diurnal variation in electrical power demand, and in some of the methods, the time-related electrical demand data also indicates seasonal variation in electrical power demand.

In other methods incorporating the inventive concept, the time-related electrical demand data is real-time data obtained from the electrical power source.

In many of these methods, the step of adaptively adjusting at least one control parameter of the process maximizes energy consumption during periods of low electrical demand at the electrical power source.

BRIEF DESCRIPTION OF THE DRAWINGS

A better understanding of the inventive concept will be had by reference to the appended drawings, wherein identical reference numbers identify identical parts and wherein:

FIG. 3A graphically depicts the same exemplary model as FIG. 2A; and

FIG. 3B shows how a state of the art controller would operate with no assistance from the exemplary model.

DETAILED DESCRIPTION OF THE PREFERRED EMBODIMENTS

Figure 1A:
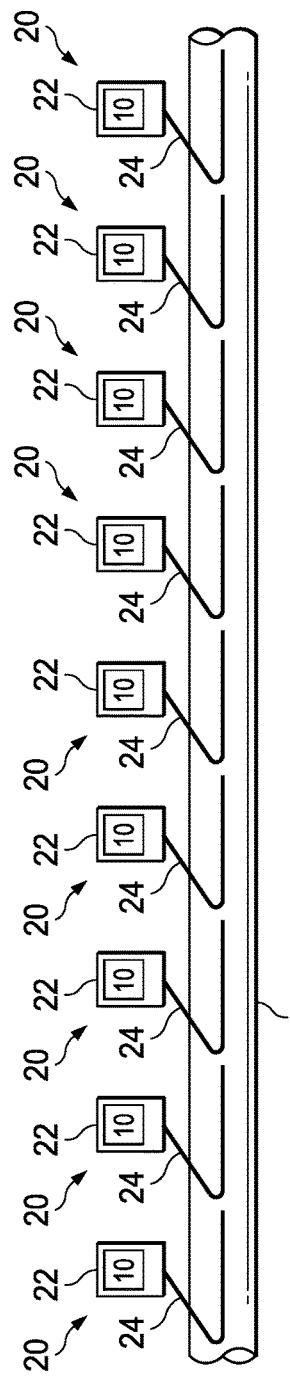
FIG. 1A shows a system of control devices as known in the prior art, implemented on a pipeline under normal operation.
Figure 1B:
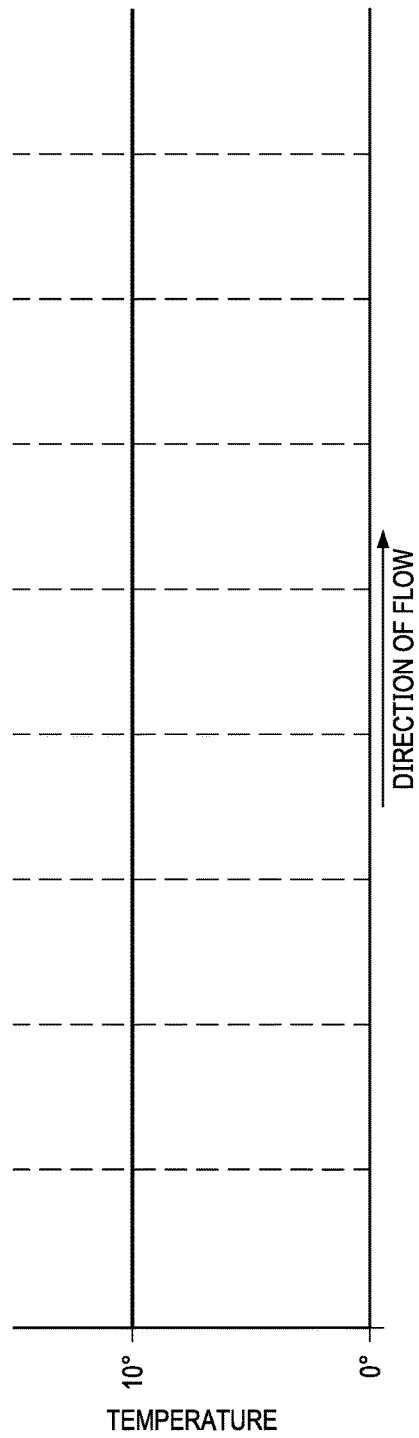
FIG. 1B shows a temperature versus distance diagram for the system of FIG. 1A.

As an illustrative example only, FIG. 1A schematically depicts a section of a pipeline 100. A plurality of heating systems 20 are arranged sequentially along the pipeline 100. Each heating system 20 has a thermostat 22 and a length of heat tracing line 24. In a hypothetical such as this, the systems 20 may be arranged at intervals of approximately 200 meters. A sensor 24 is in contact with the pipeline 100 and detects a temperature of the pipeline skin, which the sensor provides as an input signal to the thermostat 22, so that the power supplied to the heat tracing 24 may be controlled. In many of the systems of this type, power is applied to maintain a setpoint temperature. In the specific illustrative example, FIG. 1B shows how temperature varies with distance along the pipeline 100 when the system is operating ideally, with the setpoint at 10° C. In actual practice, the extremely flat horizontal slope of the temperature profile is not achieved, although the excursions are probably sufficiently minimal that they may be ignored. FIG. 1B also shows a baseline at 0° C., as this is a freezing temperature for water. Operation as depicted in FIGS. 1A and 1B is trivial as long as each and every heating system 20 operates nominally. While it may be desirable to have the heating systems 20 operate in an interactive manner, this is not necessary in order to achieve at least some of the benefits of the inventive concept.

Figure 2A:
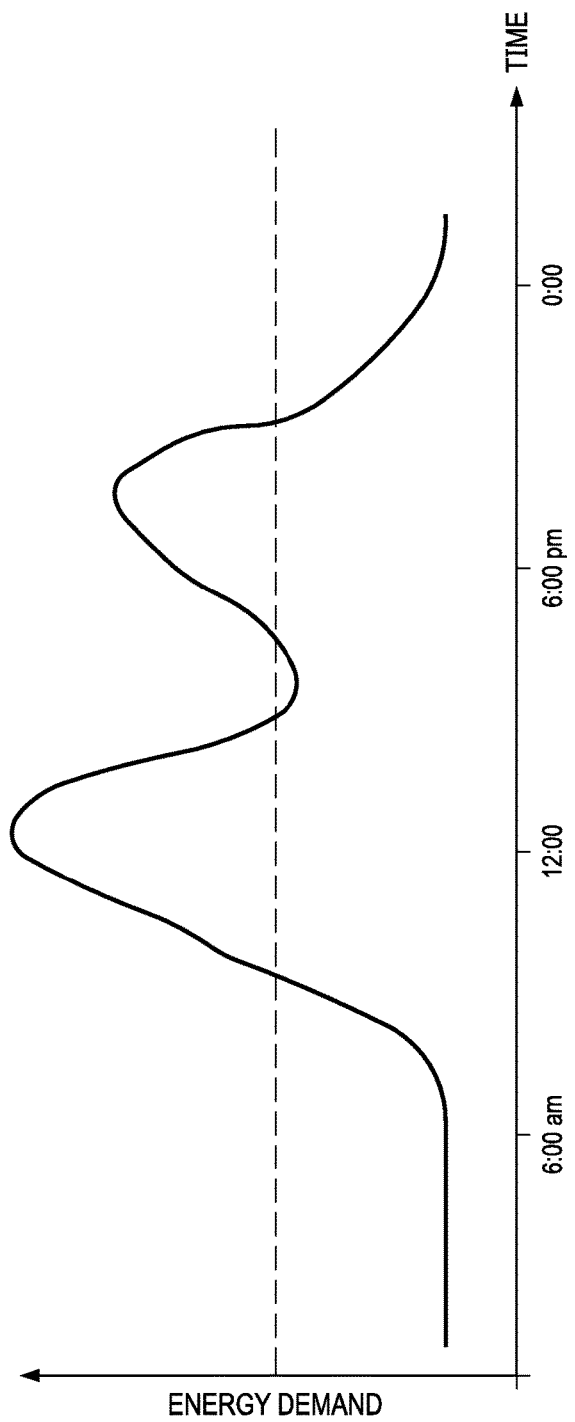
FIG. 2A graphically depicts an exemplary model for diurnal electrical energy usage, for a period from midnight to the following midnight.
Figure 2B:
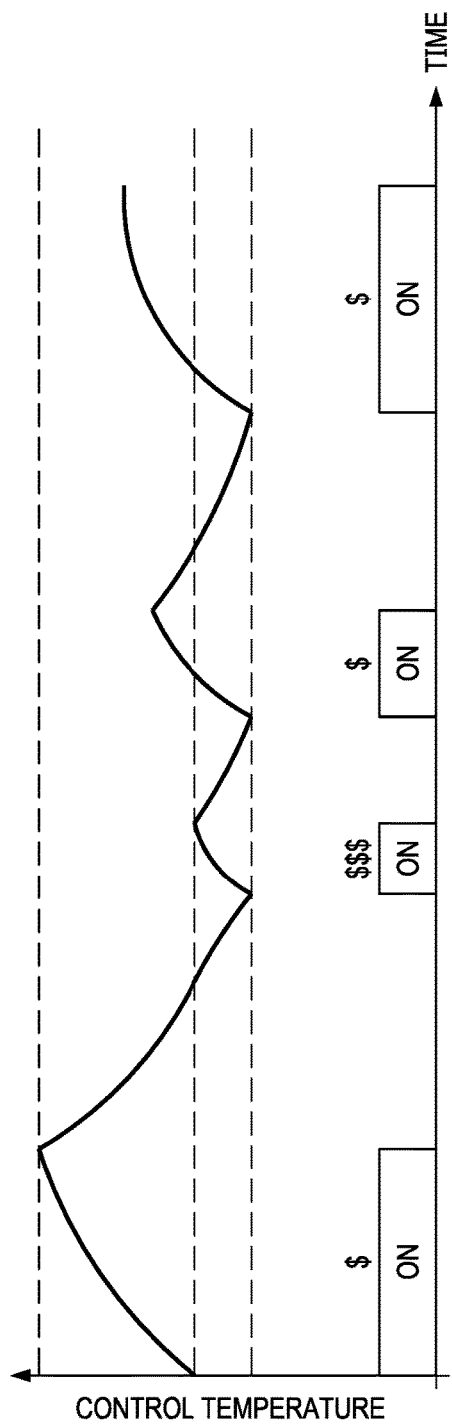
FIG. 2B graphically depicts an implementation of the inventive concept for the maintaining temperature of the pipeline of FIG. 1A, using adaptive control based on FIG. 2A.

As is well-known, the demand for electrical power in most locations has a natural variation on a diurnal and seasonal basis. FIG. 2A depicts an exemplary diurnal variation in electrical energy demand over a 24-hour period from midnight to midnight. In a first portion of this graph, from midnight until about 6 am, electrical energy demand is at a local minimum. As people awaken and begin their daily activity, electrical energy demand rises, reaching a local maximum towards the lunchtime of noon. In this example, electrical energy demand falls in the afternoon, suggesting that this example may be from a season where heating is required rather than air-conditioning. In any case, demand hits a local minimum as late afternoon arrives and the people return home or go to dinner. Electrical demand rises as food is prepared at 6 pm. and shortly after. As the evening progresses, electrical demand is largely for lighting and this demand declines as the population settles down for the night. By midnight, the electrical demand falls to the overnight minimum seen at the first portion of the graph. Of course, there are clearly variations depending upon the day of the week and most certainly depending upon the season, but the base model of FIG. 2A is useful for describing an operational model for the adaptive control obtainable using the inventive concept.

An important observation about the electrical demand curve is that the electrical grid cannot store energy. As demand rises, additional electrical energy needs to enter the grid from the suppliers, including additional suppliers. If the grid operates efficiently, each new marginal unit that is added to the grid enters at a per unit price that at least matches, if not exceeds, the unit price of the most recently added marginal unit. Assuming that to be the case, the demand curve of FIG. 2A will be understood to be a curve depicting marginal price of the electrical energy and the slope of the curve will represent the rate of change of the marginal price.

In a first aspect of the inventive concept, a controller using two point control is provided, for adaptive control, with an electrical energy demand curve as depicted in FIG. 2A. While two-point control is illustrated, the inventive concept is broadly applicable to a variety of controllers that will derive control from a selected parameter. Knowing from the demand curve that demand is low between midnight and 6 am, the controller increases the setpoint and the temperature of the pipeline is increased above the normal baseline, anticipating that electrical demand will increase towards 6 am, As the slope of the demand curve rises, power is not used, and the pipeline temperature falls, as the "reservoir" of heat energy in the pipeline itself is expended.

Just before noon, the temperature of the pipeline has dropped enough that the bottom setpoint is reached and energy is needed to prevent frost. Unfortunately, the energy demand/cost is at or near a local maximum, so the base setpoint is used to add a short burst of necessary, but not inexpensive, electrical energy. This avoids the frost issue and when the base setpoint temperature is reached, power is again turned off.

With power turned off, the temperature of the pipeline again declines, with the rate of decline being influenced by local conditions around the pipeline. In this case, the bottom setpoint is reached about when the late afternoon local minimum of electrical demand/price is reached. Rather than advancing the setpoint to the high setpoint used between midnight and 6 am, an intermediate setpoint between the base setpoint and the high setpoint is used, so that the less expensive energy is used to raise the pipeline temperature high enough to hold through the evening local maximum.

When heat is again required, the evening local maximum has passed and energy demand/cost is on a strong downward slope, headed for the overnight local minimum. Just as a high setpoint was used to warm the pipeline to the high setpoint during the overnight minimum, the pattern repeats and the control algorithm, aided by a model of the diurnal pattern, has adaptively reduced the cost of maintaining temperature in the pipeline.

Attention is now directed for illustrative purposes to FIGS. 3A and 3B, where FIG. 3A should be recognizable as the same diurnal depiction of electrical energy as shown in FIG. 2A. However, FIG. 3B shows how a state of the art controller would operate on the pipeline system of FIG. 1A, without the assistance of adaptive control from the control algorithm. Not much attention needs to be paid to FIG. 3A, as FIG. 3B shows a simple up and down cycling between the base setpoint and bottom setpoint, where energy is needed to avoid frost. This is done without regard to the time or the energy demand in the grid. As a result, one daily cycle occurs at a greater cost, even though the temperature of the base setpoint was never exceeded.

In an ideal version of the embodiment, a database of historic diurnal energy demand curves, based on the date, is used to implement the algorithm, and, in the most ideal version of the embodiment, a real time view of the energy demand, including trending slope information, is used to feed the controller for setpoint adjustments.

While the inventive concept is described as implemented on a system of sequentially-arranged thermostats to control temperature in a pipeline, it will be understood by one of skill in the art that the same concept may be used to adaptively control electrical energy consumption in any process that has the ability to "reservoir" the work provided by the electrical energy for release over time, by adjusting a parameter that controls the amount of energy being demanded from the grid. Some of the potential applications include the maintenance of temperature in a pool, a central water heating system, a home compressor, charging of batteries, either directly or in a device such as a cell phone, or a pump for circulating water. The main issue is a tolerance of the system to altering the level of the control value or the time slot.

What is claimed is:

1. A system for controlling an adjustment process for a target system that draws power from an electrical power source, comprising:

a plurality of devices for applying electrical power from the electrical power source to the target system to cause energy changes at the target system, each of the devices having a controller configured to operatively control application of the electrical power, and one or more sensors arranged to supply a feedback signal to the controller regarding energy state of the target system and the application of power; and a central controller, in communication with each controller of the plurality of devices, the central controller configured to receive time-related electrical energy demand data from the electrical power source, data from the controllers regarding the energy state of the target system, and implement a control algorithm which, when implemented:

establishes a process value maximum and a process value minimum;

monitors the energy state of the target system;

where the energy state of the target system reaches or approaches the process value minimum at a first given instance of time while the time-related electrical energy demand data at the first given instance of time or a first corresponding instance of time is at or approaching a diurnal or seasonal low, commanding the controllers to draw power from the electrical source until the process value maximum is reached; and where the energy state of the target system reaches or approaches the process value minimum at a second given instance of time while the time-related electrical energy demand data at the second given instance of time or a second corresponding instance of time is at or approaching a diurnal or seasonal high, commanding the controllers to draw power from the electrical source until an energy value point is reached which is above the process value minimum but less than the process value maximum.

2. The system of claim 1, wherein the central controller receives and utilizes the electrical energy demand data in real-time from the electrical power source as an input for the control algorithm.

3. The system of claim 1 wherein:

the process value control minimum comprises a temperature control minimum value and a pressure control minimum value;

the process value control maximum comprises a temperature control maximum value and a pressure control maximum value; and the energy state of the target system is measured temperature values and pressure values.

4. The system of claim 1 wherein:

the process value control minimum comprises a temperature control minimum value;

the process value control maximum comprises a temperature control maximum value; and the energy state of the target system is measured temperature values.

5. The system of claim 4 wherein:

the target system comprises a passageway for carrying a fluid;

the plurality of devices comprise heating elements situated along the passageway and electrically connected to the electrical power source to produce heat;

the one or more sensors are positioned to sense at least one of: the temperatures and the pressures of the passageway or the fluid therein; and the controller comprises a thermostat in electronic communication with the one or more sensors and the electrical power source.

6. The system of claim 4 wherein:

the target system comprises a pipe for carrying a fluid;

the plurality of devices comprise heat tracing lines situated along the pipe and electrically connected to the electrical power source;

the one or more sensors are positioned to sense a temperature of an outer surface of the pipe;

the controller comprises a thermostat in electronic communication with the one or more sensors and the electrical power source;

the temperature control minimum is set above a freezing point for the fluid; and the temperature control maximum is set below a boiling point for the fluid.

7. The system of claim 1 wherein:

the process value control minimum comprises a pressure control minimum value;

the process value control maximum comprises a pressure control maximum value; and the energy state of the target system is measured pressure values.

8. The system of claim 1 wherein:

the target system comprises any one of: a pool, a battery, and a pump.

9. The system of claim 1 wherein:

the central controller is configured to monitor the energy state of the target system and adjustable command the controllers to draw power from the electrical source in substantially real time.

* * * * *